US007007981B2

(12) United States Patent
Yoshino (10) Patent No.: US 7,007,981 B2
(45) Date of Patent: Mar. 7, 2006

(54) CONNECTING STRUCTURE OF PIPE AND PIPE JOINT AND METHOD OF CONNECTING THE PIPE TO THE PIPE JOINT (75) Inventor: Makoto Yoshino, Okazaki (JP)

(73) Assignee: DENSO Corporation, Kariya (JP)

( * ) Notice: Subject to any disclaimer, the term of this patent is extended or adjusted under 35 U.S.C. 154(b) by 45 days.

(21) Appl. No.: 10/653,560

(22) Filed: Sep. 2, 2003

(65) Prior Publication Data

US 2004/0041396 A1 Mar. 4, 2004

(30) Foreign Application Priority Data

Sep. 3, 2002 (JP) ............................. 2002-257672
Mar. 20, 2003 (JP) ............................. 2003-077900

(51) Int. Cl.
F16L 41/00 (2006.01)
F16L 5/00 (2006.01)
(52) U.S. Cl. ................. 285/205; 285/206; 285/148.22; 285/148.27
(58) Field of Classification Search ................ 285/205, 285/206, 148.22, 148.27
See application file for complete search history.

(56) References Cited

U.S. PATENT DOCUMENTS

| 115,785 | A | * | 6/1871 | Thatcher | ................ | 285/148.22 |
| 1,215,451 | A | * | 2/1917 | White | ................ | 60/696 |
| 1,737,633 | A | * | 12/1929 | Beach | ................ | 285/148.22 |
| 3,844,586 | A | * | 10/1974 | Olen | ................ | 285/8 |
| 4,147,382 | A | * | 4/1979 | Wachter | ................ | 285/189 |
| 5,044,674 | A | * | 9/1991 | Hendrickson | ............ | 285/147.1 |
| 5,227,304 | A | * | 7/1993 | Wong | ................ | 436/17 |
| 5,364,136 | A | * | 11/1994 | Forti et al. | ............. | 285/148.22 |
| 5,593,279 | A | * | 1/1997 | Hayashi | ................ | 415/213.1 |
| 5,853,201 | A |  | 12/1998 | Izumi et al. |  |  |
| 6,209,319 | B1 | * | 4/2001 | Maeda et al. | ................ | 60/323 |
| 6,318,765 | B1 | * | 11/2001 | Slais et al. | ................ | 285/305 |
| 6,328,351 | B1 |  | 12/2001 | Kato et al. |  |  |

FOREIGN PATENT DOCUMENTS

| JP | 7-12283 | 1/1995 |
| JP | 2001-248773 | 9/2001 |
| WO | WO 01/63168 | 8/2001 |

OTHER PUBLICATIONS

French Search Report dated Oct. 15, 2004 in French Application No. 0310433.

* cited by examiner

Primary Examiner—Vishal Patel
(74) Attorney, Agent, or Firm—Harness, Dickey & Pierce, PLC (57) ABSTRACT In a connecting structure of a pipe of an air conditioning unit and a pipe joint for supporting the pipe, an insertion hole through which the pipe is inserted is formed within the pipe joint. The insertion hole has substantially a L-shaped cross-section and includes a first portion for receiving an end portion of the pipe and a second portion for receiving a flat portion of the pipe. The second portion is elliptical-shaped. In connecting the pipe to the pipe joint, the pipe is pressed into the insertion hole by a pressing punch. As a result, the pipe is bent and shaped along the elliptical shape of the second portion in the pipe joint, thereby forming the flat portion in the bend of the pipe. At the same time that the flat portion is formed, the pipe is clamped in the pipe joint.

12 Claims, 8 Drawing Sheets

CONNECTING STRUCTURE OF PIPE AND PIPE JOINT AND METHOD OF CONNECTING THE PIPE TO THE PIPE JOINT

CROSS REFERENCE TO RELATED APPLICATION

This application is based on Japanese Patent Applications No. 2002-257672 filed on Sep. 3, 2002 and No. 2003-77900 filed on Mar. 20, 2003, the disclosures of which are incorporated herein by reference.

FIELD OF THE INVENTION

The present invention relates to a connecting structure of a pipe, which connects to a refrigerating device of a vehicular air conditioning unit, and a pipe joint for supporting the pipe and a method of connecting the pipe to the pipe joint.

BACKGROUND OF THE INVENTION

With regard to a vehicular air conditioning unit, a refrigerant pipe of a refrigerating device is generally supported by a pipe joint in a form of flange. The pipe joint is fastened to the refrigerating device with bolts or screws. Specifically, a refrigerant passage is formed within the pipe joint. The pipe joint is fastened such that a first end of the refrigerant passage is connected to a refrigerant port of the refrigerating device and a second end of the refrigerant passage is connected to the end of the refrigerant pipe. After the pipe and the pipe joint are connected as above, the pipe and the pipe joint are integrally brazed.

According to the connecting structure and the method, the pipe joint has a complicated form and the connecting process takes time because of the brazing. To solve this disadvantage, a connecting method without brazing has been proposed. Such method is for example disclosed in JP-A-2000-46259 (U.S. Pat. No. 6,328,351 B1).

Figure 21:
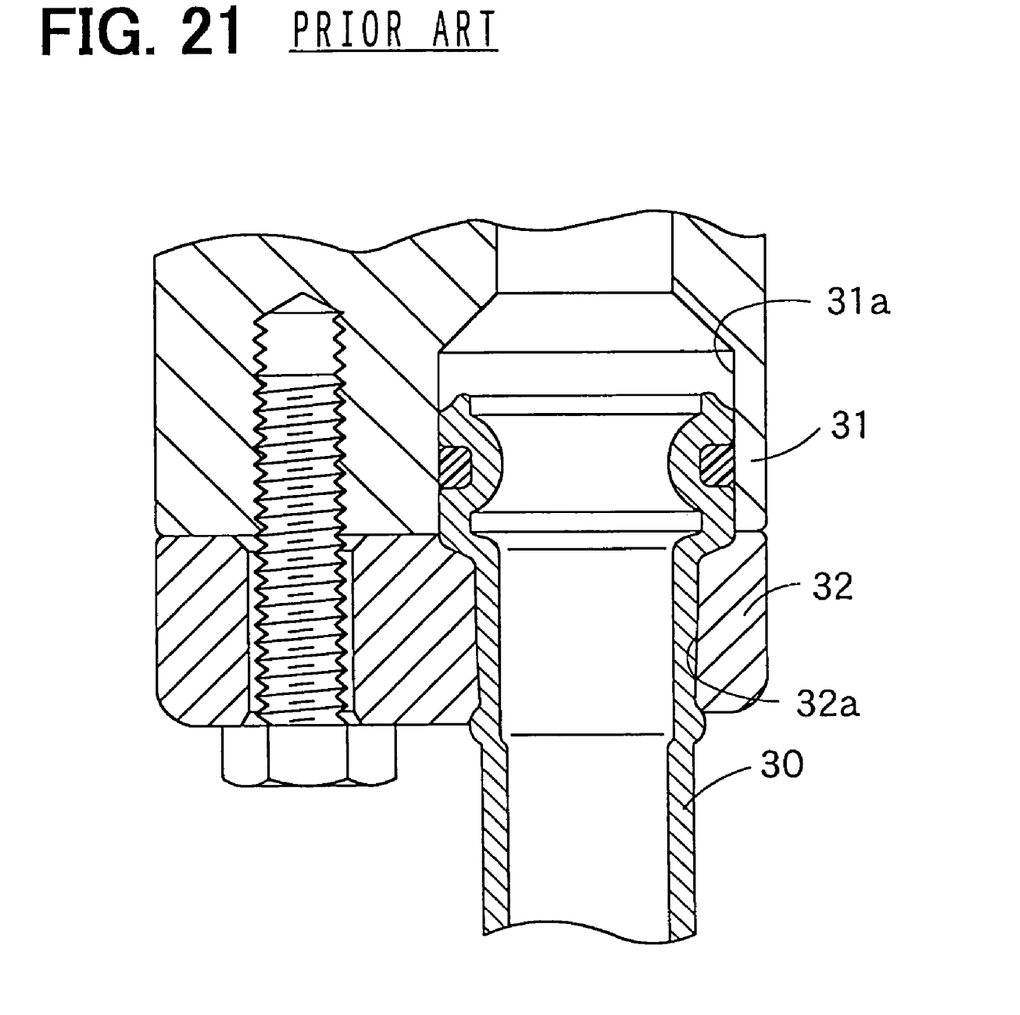
FIG. 21 is a cross-sectional view of a connecting structure of a pipe and a pipe joint according to a prior art.

According to the method, as shown in FIG. 21, an end of a pipe 30 is first inserted into an opening 31a of a joint base member 31 through an insertion hole 32a of the flange member 32. Then, the end of the pipe 30 is pressed by a punch for enlarging an inside diameter of the end of the pipe 30. As a result, the inside diameter of the end of the pipe 30 is enlarged, and therefore the pipe is fixed to the flange member 32.

In recent years, however, various devices are mounted in an engine compartment. Thus, a space for each device is limited. Especially, for providing a space for and around a refrigerating cycle, it has been required to reduce the size of the air conditioning unit. In the above connecting method, however, a jig for supporting the pipe 30 is used to connect the pipe. Thus, a space for the jig is also required. Further, in the above connecting structure, the pipe 30 extends straightly from the fixing base portion 31. Thus, the connecting structure needs a large space for the pipe 30 around the refrigerating device. Accordingly, it is difficult to connect the pipe to the refrigerating device in a small space.

SUMMARY OF THE INVENTION

The present invention is made in view of the foregoing matter and it is an object of the present invention to provide a compact connecting structure of a pipe and a pipe joint.

It is another object of the present invention to provide a method of connecting a pipe to a pipe joint in a short time.

According to a connecting structure of the present invention, a pipe connecting to a device has a flat portion a dimension of which is reduced in a direction substantially perpendicular to a longitudinal direction of the pipe other than the flat portion. A pipe joint fixed to a fixing base portion for supporting the pipe forms a housing portion for housing the flat portion of the pipe therein. The pipe is connected to the pipe joint such that the flat portion is housed in the housing portion.

Since the pipe has the flat portion, the pipe is disposed to pass through the pipe joint. Therefore, it is not necessary to arrange the pipe and the pipe joint in layers. Also, since the flat portion is housed in the pipe joint, the dimension of the pipe joint in a direction substantially perpendicular to the longitudinal direction of the pipe can be reduced even smaller than the diameter of the pipe other than the flat portion. Thus, the pipe and the pipe joint are connected in a small space. When the pipe joint is fixed to the fixing base portion, which is for example provided as a part of the device such as an air conditioning unit, it is possible to provide a space around the pipe and the pipe joint on a side opposite to the device.

According to a method for connecting a pipe of an air conditioning unit to a pipe joint for supporting the pipe, the pipe is inserted into a housing portion formed within the pipe joint. A flat portion is formed in the pipe at the same time that the pipe is inserted in the housing portion.

Before the pipe joint is fixed to a fixing base portion, the pipe is connected to the pipe joint. The pipe is for example pressed into the housing portion by a pressing device, so the pipe is clamped in the pipe joint. At the same time, the flat portion is formed in the pipe. Accordingly, the pipe and the pipe joint are processed in the short time.

Alternatively, the flat portion is formed before the pipe is inserted in the housing portion of the pipe joint. The pipe is for example pressed into the housing portion of the pipe joint by the pressing device. At this time, the pipe join functions as a die, and the shape of the flat portion is corrected along the shape of the housing portion. Further, when a dimension of the flat portion is larger than that of the housing portion, the flat portion can be press-fitted in the pipe joint. Since the pipe joint functions as the die, it is possible to bend the pipe at the same time connecting to the pipe joint.

Preferably, the housing portion forms an elliptical-shaped insertion hole. The elliptical-shaped hole is intersected by an opening on one side. Thus, after the pipe is inserted in the housing portion through the opening, the pipe can be pressed by a pressing device through the opening. As a result, the pipe is shaped along the elliptical-shape of the insertion hole and clamped in the pipe joint.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to drawings.

[First Embodiment]

Figure 1:
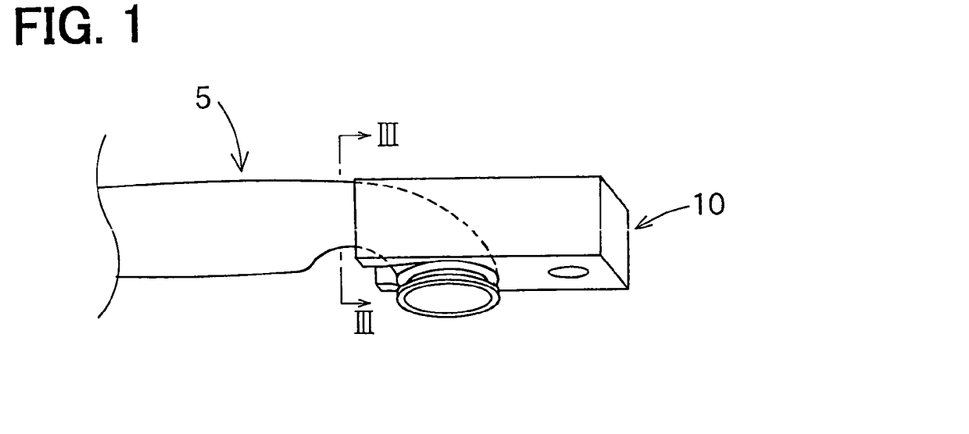
FIG. 1 is a schematic view for showing a connecting structure of a pipe and a pipe joint according to the first embodiment of the present invention.
Figure 2:
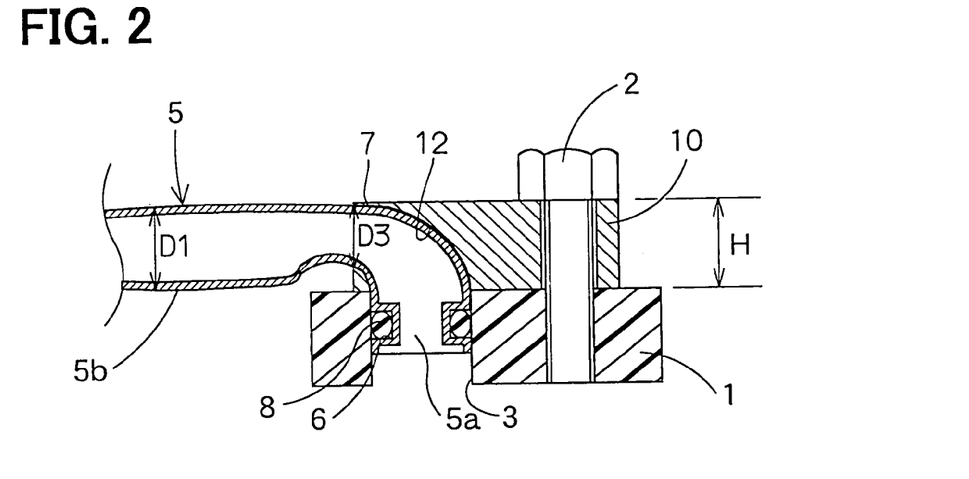
FIG. 2 is a cross-sectional view of the connecting structure of the pipe and the pipe joint according to the first embodiment of the present invention.

Referring to FIGS. 1 to 4, a pipe 5 is disposed to pass through a pipe joint 10. For example, the pipe 5 connects to a refrigerating device (not shown) of an air conditioning unit (not shown). The pipe 5 defines a passage through which refrigerant flows. The pipe joint 10 is for example fixed to a fixing base 1 of the refrigerating device by a bolt 2 as shown in FIG. 2. The pipe 5 is formed with a groove 6 at its end. An O-ring 8 is fitted in the groove 6 for sealing. The pipe 5 is supported by the pipe joint 10 and is connected to a connecting hole 3 of the fixing base 1.

Figure 3:
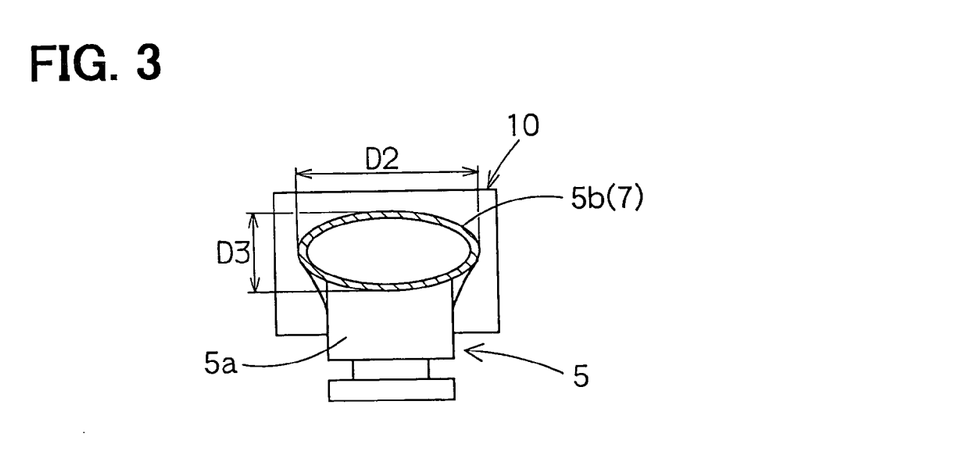
FIG. 3 is a cross-sectional view of the pipe taken along a line III—III in FIG. 1.
Figure 4:
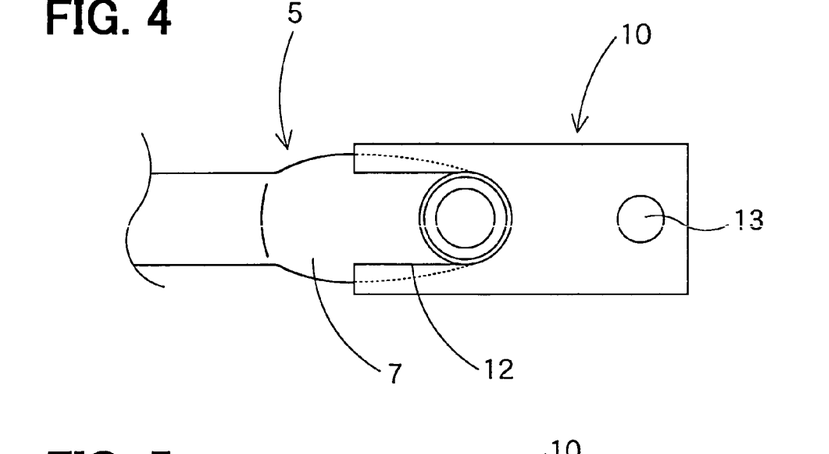
FIG. 4 is a plan view of the pipe and the pipe joint viewed from a lower side of FIG. 1.

The pipe 5 is made of metal such as aluminum, iron, copper, brass, or stainless steel. The pipe 5 is bent into substantially L-shape so that an end portion 5a is substantially perpendicular to a longitudinal direction of a main portion 5b. Also, the pipe 5 has a flat portion 7 around its bend, that is, between the end portion 5a and the main portion 5b. The flat portion 7 has substantially an elliptical-shaped cross-section. As shown in FIG. 3, the flat portion 7 is formed such that a major axis of the ellipse is perpendicular to a longitudinal direction of the end portion 5a (up and down direction in FIG. 3) and a minor axis of the ellipse is parallel to the longitudinal direction of the end portion 5a. A dimension D3 of the minor axis is smaller than an outside diameter D1 of the main portion 5b, which has substantially a circular-shaped cross-section. A dimension D2 of the major axis is greater than the outside diameter D1. The flat portion 7 has a flow area substantially same as that of the main portion 5b. The flat portion 7 is shaped along a shape of a insertion hole (housing portion) 12 formed within the pipe joint 10.

Figure 5:
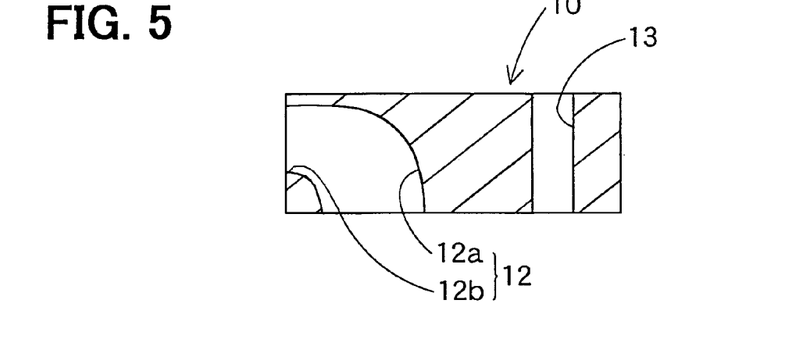
FIG. 5 is a cross-sectional view of the pipe joint according to the first embodiment of the present invention.
Figure 6A:
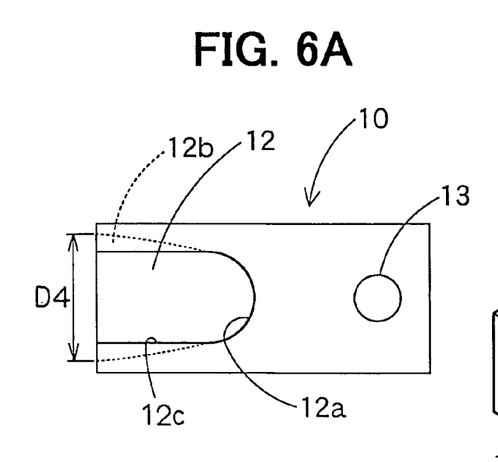
FIG. 6A is a plan view of the pipe joint according to the first embodiment of the present invention.
Figure 6B:
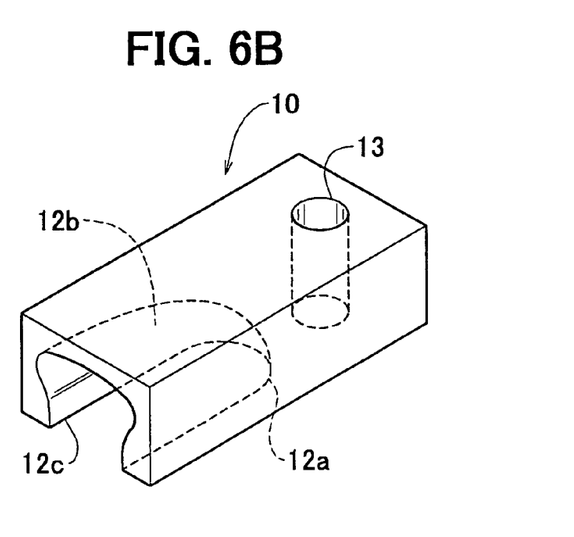
FIG. 6B is a perspective view of the pipe joint according to the first embodiment of the present invention.
Figure 7:
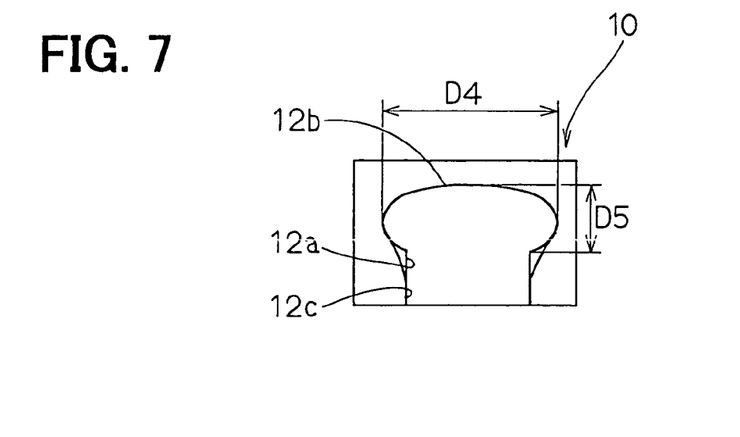
FIG. 7 is an end view of the pipe joint according to the first embodiment of the present invention.

The pipe joint 10 is made of metal such as aluminum, iron, copper, brass, or stainless steel. As shown in FIGS. 5 to 7, the pipe joint 10 is formed with the insertion hole 12 through which the pipe 5 passes. The insertion hole 12 has substantially a L-shaped cross-section and includes a first portion 12a for receiving the end portion 5a of the pipe 5 and a second portion 12b for receiving the flat portion 7 of the pipe 5. The first portion 12a is substantially perpendicular to the second portion 12b. When the pipe joint 10 is fixed to the fixing base 1, the first portion 12a communicates with the connecting hole 3 of the fixing base 1.

As shown in FIGS. 6A and 6B, the insertion hole 12 is formed into a slot to allow the pipe 5 to pass through when the pipe 5 is inserted. Specifically, the first portion 12a is circular-shaped and is intersected by an opening 12c. The second portion 12b is elliptical-shaped and is intersected by the opening 12c so that the second portion 12b has an open side or portion that is parallel to the major axis of the elliptic. Thus, the insertion hole 12 is shaped such that the circular-shape gradually changes into the elliptical-shape from the first portion 12a to the second portion 12b. The pipe joint 10 is formed with a hole 13 for the bolt 2.

The second portion 12b is the elliptical-shaped to form and houses the flat portion 7 of the pipe 5. As shown in FIGS. 6A to 7, a major axis of the ellipse is substantially perpendicular to the longitudinal direction of the pipe joint 10. A dimension D5 of a minor axis of the ellipse is smaller than the outside diameter D1 of the pipe 5. A dimension D4 of the major axis is greater than the outside diameter D1 of the pipe 5.

Accordingly, when the pipe 5 is connected to the pipe joint 10 by a pressing device, the pipe 5 is shaped to have the bent and the flat portion 7. That is, the joint 10 also functions as a die.

When the joint 10 supporting the pipe 5 is fixed to the fixing base 1 as shown in FIG. 2, the pipe 5 does not protrude from the pipe joint 10 on a side (top side in FIG. 2) opposite to the fixing base 1. Thus, there is a space around the main portion 5b and the pipe joint 10 on the side opposite to the fixing base 1. Also, the flat portion 7 is housed in the second portion 12b of the insertion hole 12, and the minor axis (D5) of the ellipse of the second portion 12b is shorter than a dimension (height) H of the pipe joint 10. Thus, the dimension H of the pipe joint 10 can be smaller than the outside diameter D1 of the main portion 5b of the pipe 5.

Figure 9:
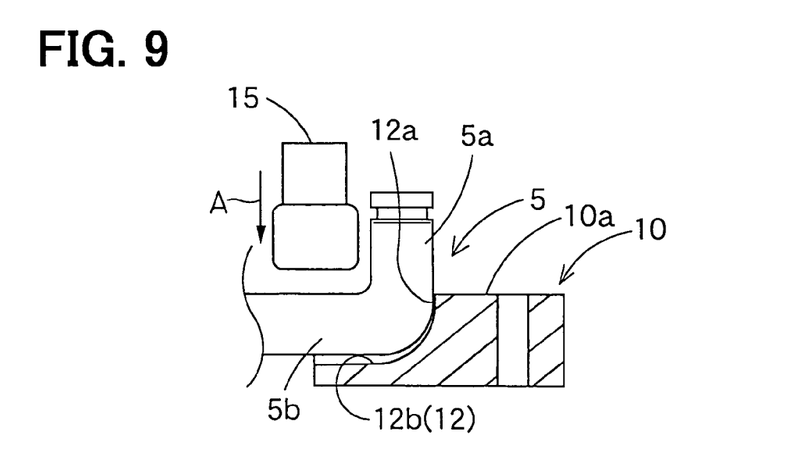
FIG. 9 is a schematic view of the pipe and the pipe joint for showing another step of connecting the pipe to the pipe joint according to the first embodiment of the present invention.
Figure 10:
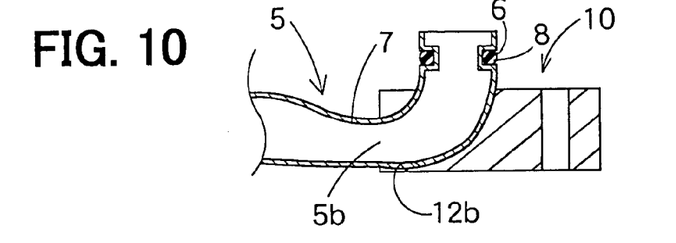
FIG. 10 is a schematic view of the pipe connected to the pipe joint according to the first embodiment of the present invention.

Next, a method for connecting the pipe 5 to the joint 10 will be described with reference to FIGS. 8 to 10. In the first embodiment, the pipe 5 is bent into the L-shape before it is connected to the pipe joint 10. The flat portion 7 is formed at the same time that the pipe 5 is connected to the pipe joint 10.

Figure 8:
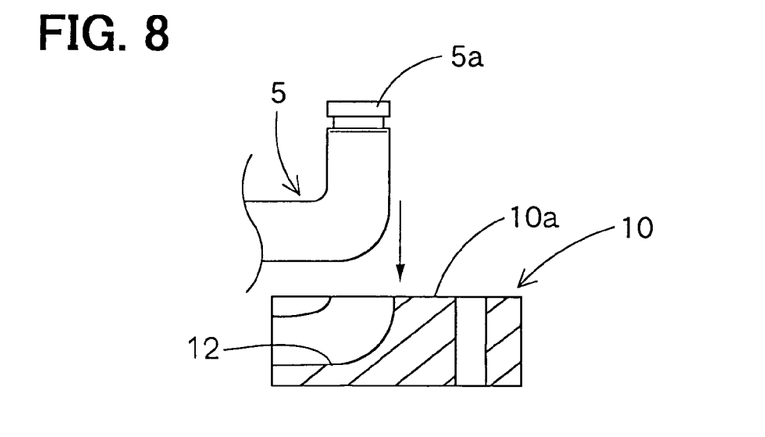
FIG. 8 is a schematic view of the pipe and the pipe joint for showing a step of connecting the pipe to the pipe joint according to the first embodiment of the present invention.

As shown in FIG. 8, the pipe joint 10 is arranged on a stage (not shown) of the pressing device (not shown) such that the opening 12c of the insertion hole 12 is up. The pipe 5 is arranged on the pipe joint 10 such that the end portion 5a opens upward. Next, the main portion 5b of the pipe 5 is pressed by a pressing punch 15 toward the second portion 12b of the insertion hole 12 (in a direction denoted by an arrow A1), as shown in FIG. 9. As a result, the flat portion 7 is formed around the bend of the pipe 5 along the elliptical shape of the second portion 12b, and the pipe 5 is clamped in the pipe joint 10, as shown in FIG. 10.

Next, the O-ring 8 is fitted in the groove 6 of the end portion 5a. Then, the joint 10 is fixed to the fixing base 1 so that the end portion 5a is connected to the connecting hole 3 of the fixing base 1. Here, the groove 6 can be formed after the pipe 5 is clamped in the pipe joint 10.

In this way, the flat portion 7 is formed at the same time that the pipe 5 is clamped in the pipe joint 10. Thus, the pipe 5 is connected to the joint 10 in a short time.

Since the bend of the pipe 5 is housed within the pipe joint 10, the pipe 5 can be connected without protruding from the pipe joint 10 on the side opposite to the fixing base 1. Thus, it is possible to make a space around the pipe joint 10 on the side opposite to the fixing base 1. Also, the pipe 5 can be connected to the fixing base 1 in the small space. Since the bend of the pipe 5 is housed in the pipe joint 10, the main portion 5b of the pipe 5 and the pipe joint 10 can be arranged in line. Thus, it is not necessary to layer the pipe joint 10 and the pipe 5. Accordingly, the joint 10 and the pipe 5 can be arranged in the small space.

Further, the dimension D3 (minor axis) of the flat portion 7 is smaller than the outside diameter D1 of the main portion 5b of the pipe 5. Thus, it is possible to make the dimension H of the pipe joint 10 smaller than the outside diameter D1 of the main portion 5b of the pipe 5. Accordingly, it makes the connecting structure further compact.

In addition, since the flat portion 7 has the flow area same as that of the main portion 5b of the pipe 5, flow of the fluid in the pipe 5 is not obstructed at the flat portion 7.

Figure 11:
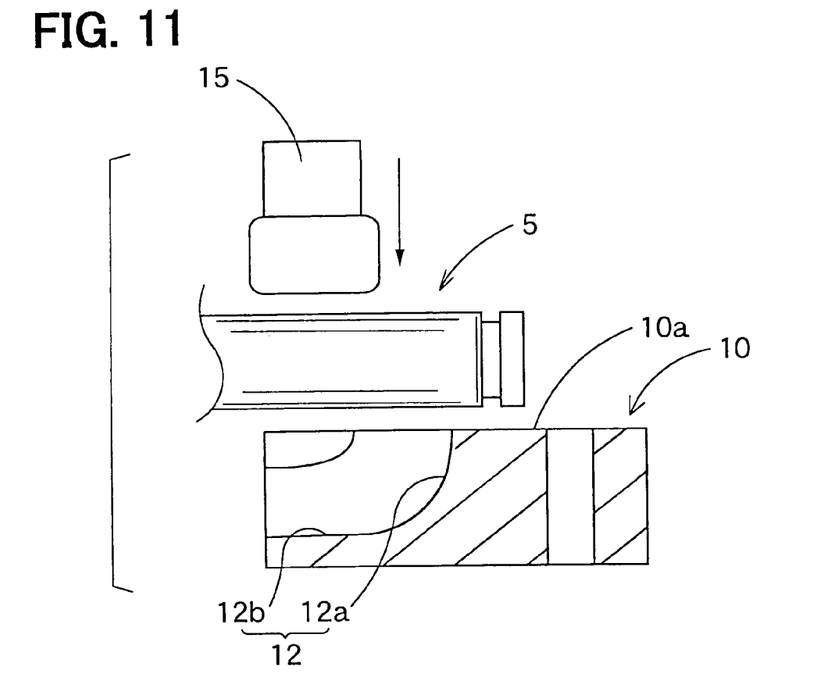
FIG. 11 is a schematic view of a straight pipe and the pipe joint for showing a step of connecting the pipe to the pipe joint according to a modification of the first embodiment of the present invention.

In a case that the pipe 5 is not bent before inserted in the pipe joint 10, that is, the pipe 5 is straight-shaped, the straight pipe 5 is arranged on the joint 10 in parallel with the longitudinal direction of the pipe joint 10, as shown in FIG. 11. Then, the pipe 5 is partly pressed by the pressing punch 15 toward the second portion 12b of the joint 10. As a result, the pipe 5 is bent into substantially the L-shape, as shown in FIG. 10. At the same time, the flat portion 7 is formed in the pipe 5 and the pipe 5 is clamped in the joint 10. Then, the O-ring 8 is fitted on the groove 6 and the joint 10 is fixed to the fixing base 1 in a manner similar to the above.

Accordingly, it is possible to bend the pipe 5 at the same time that the flat portion 7 is formed and the pipe 5 is clamped in the pipe joint 10. Since the step of bending the pipe 5 prior to the connecting can be eliminated, it is possible to further shorten the processing time for connecting the pipe 5 to the joint 10.

[Second Embodiment]

In the second embodiment, the straight-shaped or L-shaped pipe 5 in which the flat portion 7 is previously formed is arranged in the pressing device and then connected to the pipe joint 10.

Figure 12:
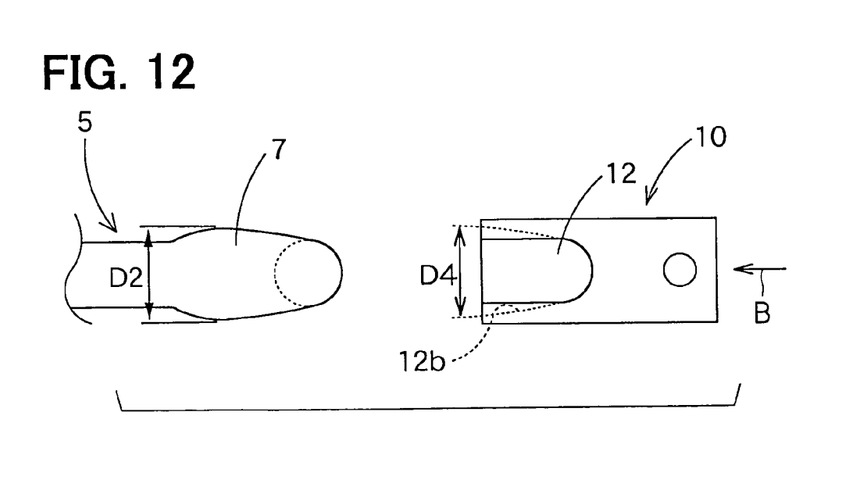
FIG. 12 is a schematic view of the pipe and the pipe joint for showing a step of connecting the pipe to the pipe joint according to the second embodiment of the present invention.

Here, the maximum dimension D4 of the second portion 12b of the insertion hole 12, that is, the major axis of the ellipse, is smaller than the maximum dimension D2 of the flat portion 7, that is, the major axis of the ellipse, as shown in FIG. 12.

In connecting the pipe 5 to the pipe joint 10, the pipe 5 is first arranged on the pipe joint 10 as shown in FIG. 8. Next, the main portion 5b of the pipe 5 is pressed into the pipe joint 10 by the pressing punch 15, in a manner similar to the first embodiment. As a result, the flat portion 7 is press-fitted in the second portion 12b of the insertion hole 12 since the dimension D2 of the flat portion 7 is greater than the dimension D4 of the second portion 12b of the insertion hole 12.

Alternatively, the pipe 5 is arranged adjacent to the insertion hole 12 of the pipe joint 10, as shown in FIG. 12. Then, the pipe joint 10 is pressed toward the pipe 5 as denoted by an arrow B in FIG. 12, so that the flat portion 7 is press-fitted in the second portion 12b of the insertion hole 12. In this way, the pipe 5 is clamped in the pipe joint 10.

Since the pipe joint 10 functions as the die, the shape of the flat portion 7, which is previously formed, can be corrected along the shape of the second portion 12b. Further, in a case that the pipe 5 is straight-shaped before the connecting, the pipe 5 can be bent at the same time that the pipe 5 is clamped in the pipe joint 10. Thus, the pipe 5 can be connected to the pipe joint 10 in the short time.

[Third Embodiment]

Figure 13:
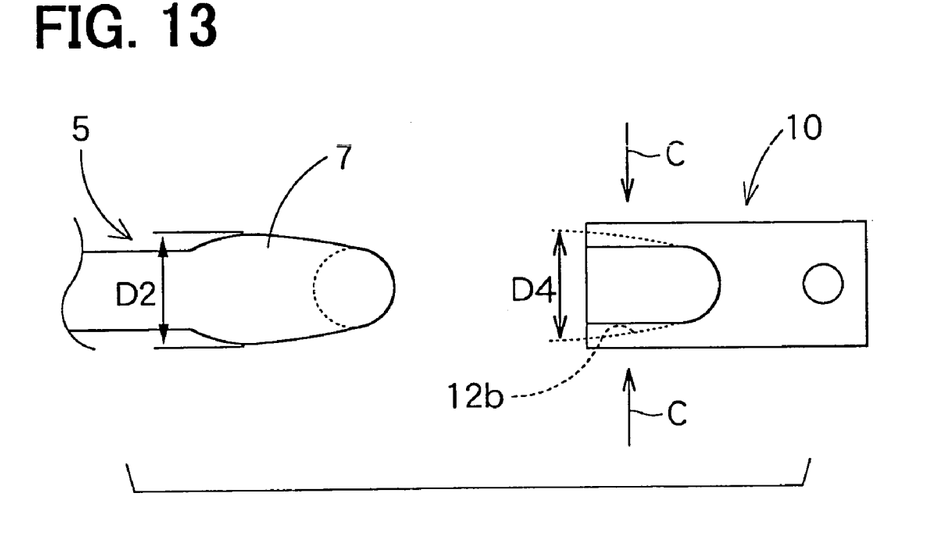
FIG. 13 is a schematic view of the pipe and the pipe joint for showing a step of connecting the pipe to the pipe joint according the third embodiment of the present invention.

In the third embodiment, the maximum dimension (major axis) D2 of the flat portion 7 is greater than the maximum dimension D4 of the second portion 12b of the insertion hole 12, as shown in FIG. 13. After the pipe 5 is inserted in the insertion hole 12 of the pipe joint 10, the pipe joint 10 is pressed in the direction substantially perpendicular to the longitudinal direction of the pipe 5, as denoted by arrows C in FIG. 13, by the pressing device. Thus, the flat portion 7 is surrounded by the walls of the pipe joint 12 defining the insertion hole 12. Accordingly, the pipe 5 is clamped in the pipe joint 10.

[Fourth Embodiment]

Figure 14:
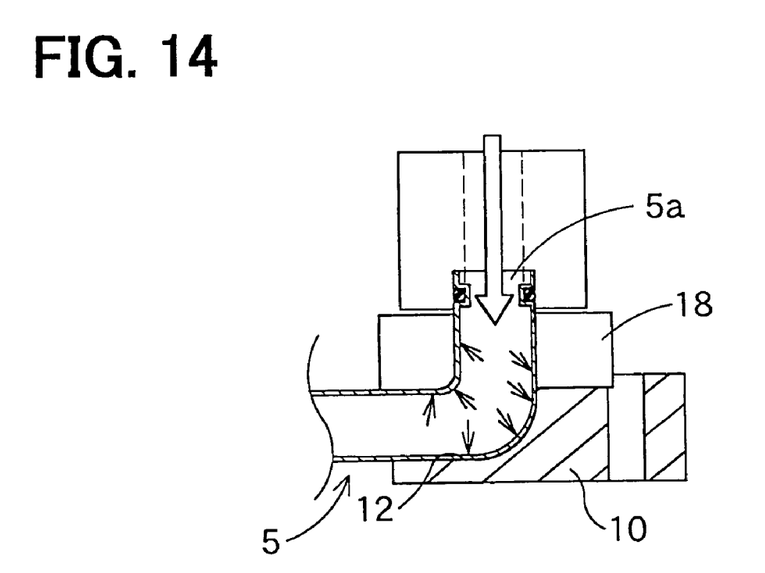
FIG. 14 is a cross-sectional view for showing a method of connecting the pipe to the pipe joint according to the fourth embodiment of the present invention.

In the fourth embodiment, the L-shaped pipe 5 is clamped in the pipe joint 10 by a hydraulic bulge process. First, the pipe 5 is inserted in the insertion hole 12 of the pipe joint 10 in a manner similar to that shown in FIG. 8. Next, as shown in FIG. 14, a molding die 18 is placed on the pipe joint 10 so that the pipe 5 is supported with the pipe joint 10. In this condition, liquid such as oil or water is injected to the pipe 5 from the end portion 5a so that the pipe is filled with the fluid and pressurized. Thus, the pipe 5 is pressed from the inside by the hydraulic pressure toward the wall of the insertion hole 12 and the molding die 18. As a result, the flat portion 7 is formed in the pipe 5 and the pipe 5 is clamped in the pipe joint 10, as shown in FIG. 10.

Since the flat portion 7 is formed at the same time that the pipe 5 is clamped in the joint 10, the connecting process can be performed in the short time.

[Fifth Embodiment]

Figure 15:
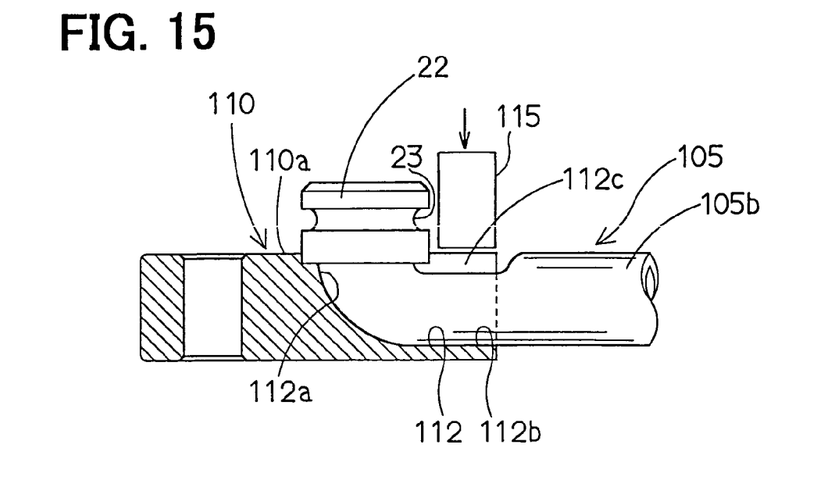
FIG. 15 is a cross-sectional view of a pipe and a pipe joint according to the fifth embodiment of the present invention.
Figure 16:
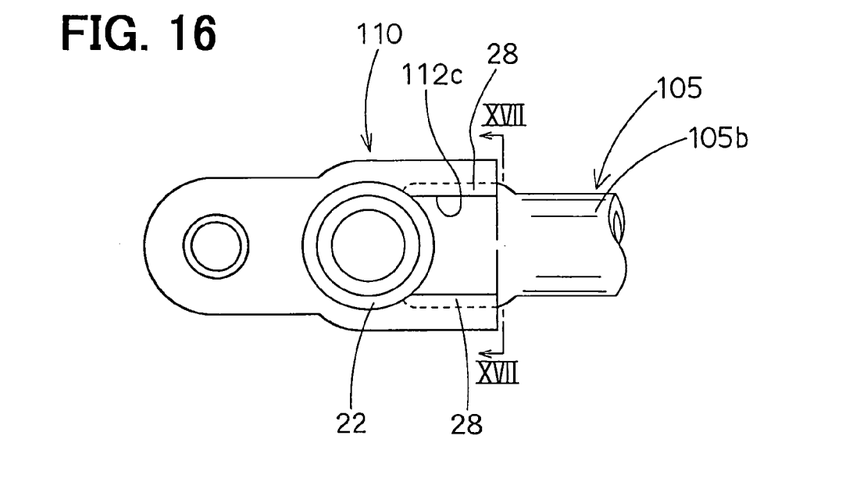
FIG. 16 is a plan view of the pipe and the pipe joint viewed from a lower side in FIG. 15.
Figure 17:
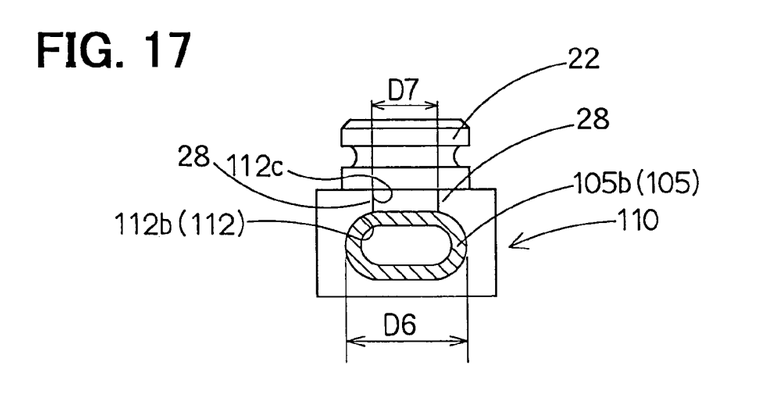
FIG. 17 is a cross-sectional view of the pipe taken along a line XVII—XVII in FIG. 16.

In the fifth embodiment, a pipe 105 is inserted in a pipe joint 110 and then pressed by the pressing device. The pipe 105 has substantially a circular-shaped cross-section, and does not have a flat portion before it is inserted in the pipe joint 10. As shown in FIGS. 15 to 17, the pipe 105 has a pipe end joint 22, which connects to the refrigerating device, at its end. The pipe end joint 22 is formed with a sealing groove 23. The pipe end joint 22 is disposed to open in a direction substantially perpendicular to the longitudinal direction of a main portion 105b of the pipe 105 so that the pipe 105, including the pipe end joint 22, has substantially L-shape.

The pipe joint 110 has a rectangular parallelepiped-shape that is longitudinal in the direction substantially parallel to the longitudinal direction of the pipe main portion 105b. The pipe joint 110 is formed with an insertion hole 112 through which the pipe 105 is inserted in the pipe joint 110.

The insertion hole 112 is formed into a slot substantially similar to that of the first embodiment. The insertion hole 112 includes a first portion 112a, which is circular-shaped, and a second portion 112b, which is elliptical-shaped. The first portion 112a is intersected by an opening 112c so that the first portion 112a has an open side or portion. Also, the second portion 112b is intersected by the opening 112c to cause the second portion 112b to have an open side or portion that is substantially parallel to the major axis of the ellipse.

The opening 112c are defined by walls 28. As shown in FIG. 17, a dimension D7 of the opening 112c in a direction parallel to a major axis of the ellipse of the second portion 112b, that is, a distance between the walls 28, is smaller than a dimension D6 of a major axis of the ellipse. The outside diameter of the main portion 105b of the pipe 105 is slightly smaller than the dimension D7 of the opening 112c. Thus, the walls 28 function as fixing portions for fixing the pipe 105 in the insertion hole 112. The pipe 105 has an outside diameter that is slightly larger than the dimension D7 of the opening 112c.

In connecting the pipe 105 in the pipe joint 110, the pipe joint 110 is arranged so that the opening 112c opens to the top. Next, the main portion 105b of the pipe 105, which includes the pipe end joint 22, is inserted in the insertion hole 112 through the opening 112c. In this condition, since the pipe 105 has the circular-shaped cross-section, the pipe 105 partly protrudes between the walls 28 and loosely housed in the second portion 112b of the insertion hole 112.

Next, the main portion 105b of the pipe 105 is pressed by the pressing device 115 through the opening 112c, as shown in FIG. 15. As a result, the main portion 105b of the pipe 105 is deformed along the elliptical shape of the second portion 112b. Thus, the pipe 105 is clamped in the pipe joint 110. Further, the top of the deformed main portion 105b is supported by the walls 28. Thus, the pipe 105 is fixed in the insertion hole 112. The pipe end joint 22 is disposed to protrude from a fixing surface 110a of the pipe joint 110, as shown in FIGS. 15 and 17.

Accordingly, the L-shaped pipe and joint 22 and the main portion 105b of the pipe 105 are held in the elliptical-shaped second portion 112b and clamped by the walls 28. Therefore, the pipe 105, especially its bend portion, is securely fixed in the pipe joint 110.

Since the pipe 105 is connected to the pipe joint 110 without protruding from the pipe joint 110 on the side opposite to the pipe joint 22 and the fixing base, the pipe 105 and the pipe joint 110 can be arranged in a small space, similar to the first to the fourth embodiment. Further, the pipe 105 is clamped in the pipe joint 110 by pressing with the pressing device. Therefore, the pipe 105 is easily connected to the pipe joint 110 in the short time.

[Sixth Embodiment]

Figure 18:
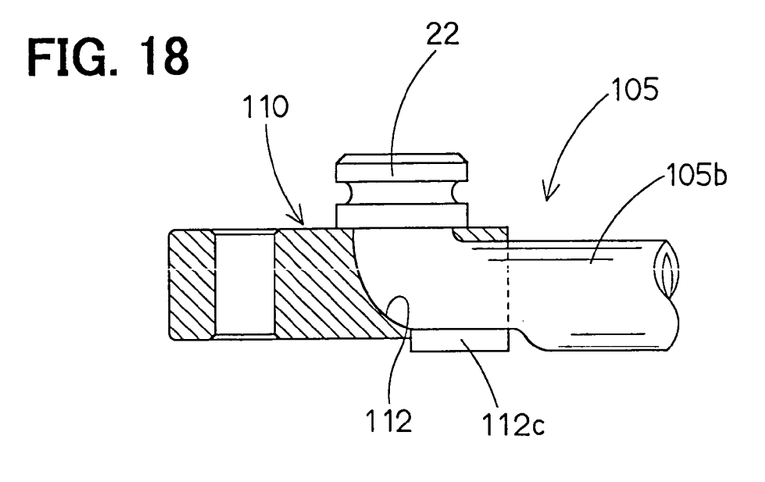
FIG. 18 is a cross-sectional view of the pipe and the pipe joint according to the sixth embodiment of the present invention.
Figure 19:
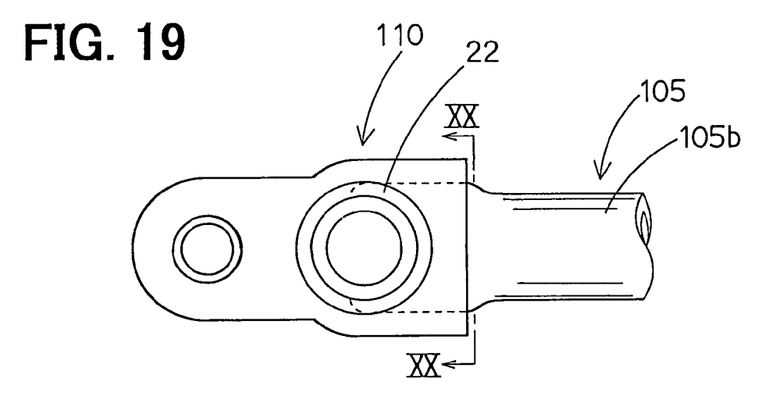
FIG. 19 is a plan view of the pipe and the pipe joint viewed from the lower side in FIG. 18 according to the sixth embodiment of the present invention.
Figure 20:
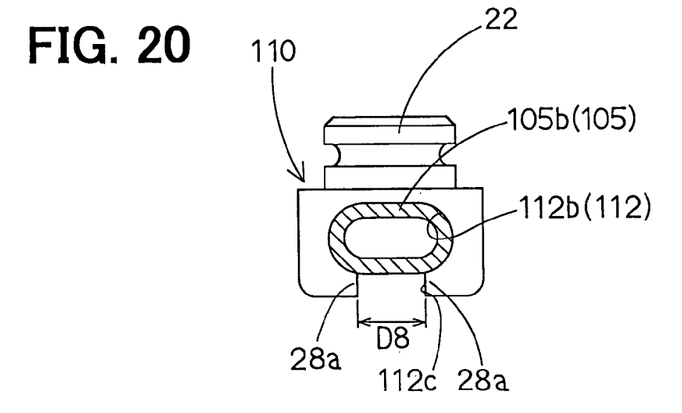
FIG. 20 is a cross-sectional view of the pipe taken along a line XX—XX in FIG. 19.

In the sixth embodiment, the pipe joint 110 has the opening 112c on a side opposite to that of the fifth embodiment, as shown in FIGS. 18 to 20. That is, the opening 112c is formed on the side opposite to the first portion 112a in which the pipe end joint 22 is housed. Thus, the pipe 105 is inserted in the insertion hole 112 from a lower side in FIG. 18.

The pipe 105 of the sixth embodiment has the shape similar to that of the fifth embodiment. The first portion 112a is circular-shaped. The second portion 112b is the elliptical-shaped and is intersected by the opening 112c through which the pipe 105 is inserted. Similar to the fifth embodiment, walls 28a, which define the opening 112c, are formed as the fixing portion for fixing the pipe 105. Here, a distance D8 between the walls 28a are slightly larger than the outside diameter of the pipe 105.

In connecting the pipe 105 to the pipe joint 110, the pipe joint 110 is placed such that the opening 112c is upward. Then, the pipe end joint 22 and the pipe 105 are inserted in the insertion hole 112 from the opening 112c. Next, the pipe 105 is pressed by the pressing device through the slot 112c. As a result, the pipe 105 is deformed and shaped along the elliptical shape of the second portion 112b. In this way, the pipe 105 is clamped in the pipe joint 110. Since the deformed portion of the pipe 105 is fixed by the walls 28a, the pipe 105 is firmly connected to the pipe joint 112. Here, the pipe end joint 22 protrudes from a fixing surface 110a, which is fixed to the fixing base 1, of the pipe joint 110.

Accordingly, the pipe 105 is held in the pipe joint 110 without protruding from the pipe joint 110 in the direction opposite to the pipe end joint 22. Thus, it makes the connecting structure compact. Since the pipe 105 is clamped by inserting in the insertion hole 112 and clamping by the pressing device, the pipe 105 is easily connected in the short time.

In the above embodiments, the pipe joint 10, 110 is made of metal. Instead, the pipe joint 10, 110 is made of resin such as nylon, polypropylene, polyethylene, epoxy, polyoxymethylene, polyphenylene sulfide, or phenol. The pipe 5, 105 is connected to such resinous pipe joint 10, 110 such as by pressing, hydrostatic bulge processing, or insert molding as described in the above.

The present invention should not be limited to the disclosed embodiments, but may be implemented in other ways without departing from the spirit of the invention.

What is claimed is:

1. A connecting structure comprising:
   a pipe connecting to a device; and
   a pipe joint having a housing portion therein and fixed to a fixing base portion for supporting the pipe,
   wherein the pipe includes a flat portion, a dimension of which is smaller than an outside diameter of the pipe other than the flat portion, the dimension being in a direction substantially parallel to a height direction of the pipe joint,
   wherein the flat portion is housed in the housing portion; and
   wherein the pipe is bent toward the fixing base portion to have a bend which is housed in the housing portion and the flat portion is formed in the bend of the pipe.

2. The connecting structure according to claim 1, wherein the housing portion forms an elliptical-shaped groove.

3. The connecting structure according to claim 2, wherein the elliptical-shaped groove is intersected by an opening so that the housing portion has an open side that is parallel to a major axis of the ellipse.

4. The connecting structure according to claim 2, wherein the flat portion has an elliptical-shaped cross-section and a major axis of the ellipse is greater than the dimension of the pipe other than the flat portion.

5. The connecting structure according to claim 1, wherein the flat portion has a flow area substantially same as that of the pipe other than the flat portion.

6. The connecting structure according to claim 1, wherein the pipe has an end portion that extends from the flat portion in a direction substantially parallel to the direction of the dimension of the flat portion and connects to the device.

7. A connecting structure comprising:
a pipe including a main portion, an end portion and a flat portion formed between the main portion and the end portion, the end portion being substantially perpendicular to the main portion; and
a pipe joint having a housing portion, which includes a first portion and a second portion substantially perpendicular to the first portion, wherein:
the flat portion has a dimension which is smaller than an outside diameter of the main portion of the pipe, the dimension being in a direction substantially parallel to a height direction of the pipe joint;
the pipe is inserted through the housing portion of the pipe joint, so that the flat portion of the pipe is housed in the second portion and the end portion of the pipe is housed in the first portion; and
the flat portion of the pipe and the second portion of the housing portion have a substantially elliptical-shaped cross section.

8. A connecting structure comprising:
a pipe connecting to a device; and
a pipe joint having a housing portion therein and fixed to a fixing base portion for supporting the pipe,
wherein the pipe includes a flat portion, a dimension of which is smaller than an outside diameter of the pipe other than the flat portion, the dimension being in a direction substantially parallel to a height direction of the pipe joint,
wherein the flat portion is housed in the housing portion; and
wherein the housing portion forms an elliptical-shaped groove.

9. The connecting structure according to claim 8, wherein the elliptical-shaped groove is intersected by an opening so that the housing portion has an open side that is parallel to a major axis of the ellipse.

10. The connecting structure according to claim 8, wherein the flat portion has an elliptical-shaped cross-section and a major axis of the ellipse is greater than the dimension of the pipe other than the flat portion.

11. The connecting structure according to claim 8, wherein the flat portion has a flow area substantially same as that of the pipe other than the flat portion.

12. The connecting structure according to claim 8, wherein the pipe has an end portion that extends from the flat portion in a direction substantially parallel to the direction of the dimension of the flat portion and connects to the device.

* * * * *